Feb. 27, 1968 L. T. KOPPL 3,370,614

PLUG FOR A PIPE

Filed May 24, 1965

INVENTOR.

LEO T. KOPPL
BY HIS ATTORNEYS
HARRIS, KIECH, RUSSELL & KERN 3,370,614
PLUG FOR A PIPE
Leo T. Koppl, 1228 W. Date St.,
Montebello, Calif. 90640
Filed May 24, 1965, Ser. No. 458,102
12 Claims. (Cl. 138—94)

ABSTRACT OF THE DISCLOSURE

A plug and sealing device for preventing flow in a pipe wherein a plug housing is positioned adjacent an open end in the pipe and a plug is drivingly inserted into the pipe where a resilient sealing element is cammed outwardly into sealing engagement with the inner wall of the pipe.

The disclosure

The invention relates to a device and method for plugging a fluid-carrying pipe or pipe section.

In various construction and repair jobs, it becomes necessary to stop the flow of fluid through a given section of pipe to allow work thereon. When a section of pipe is to be worked on, a coupon is cut from each end thereof to sever such pipe section from the main pipe. Two plugging devices are then employed, one at each end of the main pipe adjacent the pipe section to be worked on. Thus, the plugging devices prevent the flow of fluid into the pipe section.

Generally, prior art plugs have been unsatisfactory in that they allow leakage particularly at high pressures and are only recommended for use with either water or natural gas. For example, one prior art plug includes a resilient member which is forced against the open annular end of the main pipe. As the open end of the pipe is generally quite rough and jagged and in no conceivable instance would be smooth and polished, the resilient sealing element is often cut and damaged by the jagged end of the pipe. In addition, it is extremely difficult or impossible to form a tight seal against the jagged open end. Thus, this prior art seal allows leakage particularly at high pressures and is subject to damage.

Another plugging device of the prior art utilizes a packing-type cup within the passage of the pipe, the fluid pressure within the pipe being used to urge the walls of the cup into engagement with the interior wall of the pipe. This design has not been effective because pressure surges which often occur in pipe lines, tend to pull the packing cup away from the wall of the pipe to cause leakage.

An object of this invention is to provide a plugging device for use with a fluid-carrying pipe which will prevent leakage even at high-line pressures.

Another object of this invention is to provide a plugging device for a fluid-carrying pipe which may be utilized to stop the flow of various fluids including steam and is not restricted to use with natural gas and water.

Another object of this invention is to provide a plugging device for a fluid-carrying pipe in which a resilient sealing element is inserted into the pipe and deformed radially outwardly by means independent of the fluid in the pipe into fluid-tight sealing engagement with the interior wall of the pipe. More particularly, the resilient sealing element is cammed radially outwardly into sealing engagement with the wall of the pipe.

It is an object of this invention to provide a plugging device including a resilient sealing element, means for moving the sealing element to a predetermined position within the passage of the pipe, and means responsive to further actuation of the moving means after the sealing element has reached the predetermined position for deforming the resilient sealing element radially outwardly into fluid-tight sealing engagement with the interior wall of the pipe.

A particular object of this invention is to provide a plugging device which includes a body member positionable adjacent an open end of a pipe, a plug secured to the body member and including a housing carrying a resilient sealing element and cam means, means for moving the plug away from the body member and through the open end of the pipe to a predetermined position within the passageway thereof, a cam member engageable with the cam means and mounted for movement with the plug and the cam means relative to the body member, said cam means being movable relative to the cam member to force the sealing element radially outwardly into fluid-tight sealing engagement with the interior wall of the pipe, and means on the housing to halt movement of the cam member relative to the body member while allowing the plug and the cam means to continue moving away from the body member to cause the cam means to move relative to the cam member, such relative movement forcing the cam means radially outwardly to urge the sealing element into fluid-tight sealing engagement with the interior of the pipe.

According to another object, the housing has an opening therethrough for receiving at least a portion of the cam member and a cover is sealed to the housing to close the end of the opening remote from the body member.

Another object of this invention is to provide a plugging device including a body member having an annular recess facing an open end of a pipe, an internally threaded sleeve rotatably mounted in the recess and having gear means formed on the exterior thereof, a plug secured to the internally threaded sleeve by an externally threaded sleeve and a driving gear rotatably secured to the body member and meshing with the gear means for rotating the internally threaded sleeve to move the plug into the pipe.

It is frequently necessary or desirable to utilize a plugging device to plug an underground pipe. In these cases two excavations are usually formed, one at each end of the pipe section and coupons are cut so as to sever the pipe section from the main pipe. Utilizing a setting tool, a plug is then lowered through the excavation until it is in substantial axial alignment with the main pipe. The plugging device is then utilized to plug the pipe. In prior art devices, it is not possible to remove the setting tool from the plugging device and, accordingly, the setting tool must remain in position in the excavation as long as it is necessary for the pipe to remain plugged. It is frequently necessary for the pipe to remain plugged for long periods, thus tying up many of the setting tools for long periods of time.

Accordingly, it is an object of this invention to provide a plugging device which includes means which permit the setting tool to be removed from the plugging device once the latter has been properly operated to plug the pipe. More particularly, such means may include an upwardly extending threaded socket secured to the body member of the plugging device and adapted to receive a threaded shaft of the setting tool. Another object of this invention is to provide a plugging device including a rotatable shaft secured to the body member and extending upwardly therefrom, the shaft being connectible to the setting tool and rotatable thereby, means responsive to the rotation of the shaft for moving the plug into the passage of a pipe, and means responsive to a predetermined amount of rotation of the shaft for urging the plug into sealing engagement with the interior wall of the pipe.

A further object of this invention is to provide a method and plugging device particularly adapted for plugging an underground pipe and which can be lowered to a position adjacent the underground pipe by a setting tool which can be removed from the plugging device leaving the plug underground in plugging relationship with the pipe.

The invention, both as to its organization and method of operation, together with further objects and advantages thereof, may best be understood by reference to the following description taken in connection with the accompanying drawing in which.

Figure 1:
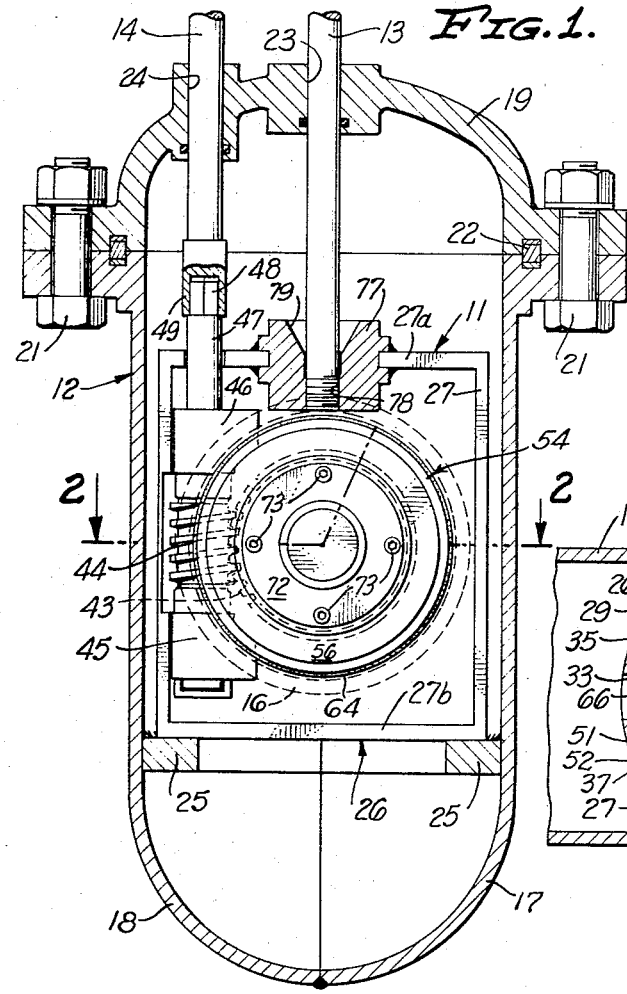
FIG. 1 is an elevational view partially in section of a plugging device of this invention and a housing therefor.

FIG. 1 illustrates a plugging device 11 of this invention disposed within a housing 12 and connected to a supporting rod 13 and a drive shaft 14 of a setting tool (not shown). In typical circumstances, a fluid-carrying main pipe 15 having an interior wall 15a is to be plugged and isolated from a pipe section 16 (FIG. 2) on which certain work is to be performed. If the main pipe 15 is underground, it will be necessary to excavate down to it and cut a circular coupon or section therefrom to sever the pipe section 16 from the pipe 15.

With the pipe section 16 severed and spaced from the pipe 15, the housing 12 may be welded to the pipe 15 and the pipe section 16. Preferably the housing 12 includes two longitudinally divided half sections 17 and 18 each individually welded to the pipes 15 and 16. A flanged end cap 19 is secured to the half sections 17 and 18 by a plurality of bolts 21 and a seal 22 seals the interface of the end cap and the half sections. Two passageways 23 and 24 are provided in the end cap 19 for receiving the supporting rod 13 and the drive shaft 14, respectively. If desired, the setting tool by means of the supporting rod 13 can lower the plugging device 11 and the end cap 19 simultaneously through the excavation to the position shown in FIG. 1. Suitable abutments 25 may be provided to arrest the downward movement of the plugging device 11 when the device is properly aligned with the longitudinal axis of the pipe 15.

The plugging device 11 includes a body member 26 having a back wall 27 with a semicylindrical outer surface, a top wall 27a (FIG. 1), and a bottom wall 27b. The outer surface of the back wall 27 abuts an end 28 of the pipe 16 which is preferably curved and generally conforms to the contour of the portion of the back wall 27 which is in engagement therewith. The pipe 16, which in most instances will be firmly anchored, provides a rigid support for the plugging device 11. If desired, the back wall 27 may be formed from several sections welded together to form an integral structure.

The body member 26 also includes a cylindrical wall 29 having an enlarged generally cylindrical and coaxial end portion 31 extending toward the pipe 15. The end of the cylindrical end portion 31 is partially closed by an annular plate 32. A hollow, generally cylindrical shaft 33 is formed integrally with the back wall 27 and extends outwardly therefrom toward the pipe 15. The hollow shaft 33 has an annular flange or abutment 34 at one end thereof and preferably is coaxial with the cylindrical wall 29 and the cylindrical end portion 31. The space between the hollow shaft 33 and the cylindrical wall 29 and the cylindrical end portion 31 forms an annular recess 35 which faces an open end 36 of the pipe 15.

Within the recess 35 an internally threaded sleeve 37 having screw threads 38 is mounted for rotation about its longitudinal axis by a pair of bearings 39 and 41. The internally threaded sleeve 37 is generally cylindrical, and has a peripheral flange 42 with a gear 43 formed thereon which is rotatable within the cylindrical end portion 31.

A driving gear or worm gear 44 is suitably rotatably secured to the body member 26 and meshes with the gear 43 for rotating the internally threaded sleeve 37 relative to the body member 26. The driving gear 44 is mounted by two bearings 45 and 46 (FIG. 1) and is secured to an upwardly extending rotatable shaft 47. The upper end of the rotatable shaft 47 is formed with flattened portions or a male socket 48 which is received by a mating female socket 49. Similarly, the upper end of the socket 49 releasably receives the lower end of the shaft 14 which forms a male socket. Thus, by securing the drive shaft 14 to a driving motor, the internally threaded sleeve 37 is caused to rotate within the annular recess 35, translation of the internally threaded sleeve relative to the body member 26 being prevented by the bearings 39 and 41.

An externally threaded sleeve 51 having external screw threads 52 is received by the internally threaded sleeve 37. A key 53 secured to the shaft 33 and a keyway formed in the inner surface of the sleeve 51 prevent rotation of the sleeve 51 relative to the hollow shaft. Thus, by appropriate rotation of the driving gear 44, the sleeve 51 may be caused to move either toward or away from the pipe 15.

Figure 4:
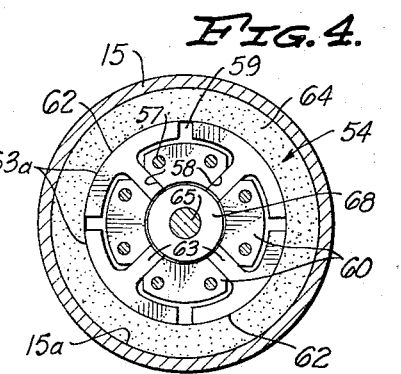
FIG. 4 is a sectional view taken along line 4—4 of FIG. 3.

A plug 54 (FIGS. 2–4) includes a generally circular rear plate 55 integral with the sleeve 51 and a generally circular front plate 56 secured thereto by screws 57. The plates 55 and 56 when secured together form a housing which is coaxial with the sleeves 37 and 51 having four radially extending grooves 58 (FIG. 4) terminating in a peripheral opening 59. The grooves 58 are defined by the spaces between adjacent projections 60 (FIG. 4) formed integrally with the rear plate 55. The plates 55 and 56 have an axial opening 61 extending therethrough.

Four cams 62 having ribs 63 slidably mounted in the radial grooves 58 are provided. Each of the cams 62 has an arcuate peripheral portion 63a which is engageable with an annular resilient sealing element 64 which surrounds the cams 62 and extends radially through the peripheral opening 59.

A rod 65 is slidably mounted within the hollow shaft 33 by means of an enlarged shoulder 66 formed on the rod. A nut 67 retains a cam member 68 adjacent the other end of the rod 65. The cams 62 and the cam member 68 have engageable inclined cam surfaces 69 and 71, respectively.

A cover 72 is secured to the front plate 56 by screws 73 and closes the end of the opening 61 remote from the body member 26. The front plate 56 has an annular circular groove 74 which receives an annular seal 75 and an annular projection 76 on the cover 72. This arrangement is very effective in preventing leakage from the pipe 15 by the surface between the front plate 56 and the cover 72.

Means are provided for releasably securing the supporting rod 13 of a setting tool (not shown) to the plugging device 11. Such means includes an upwardly extending threaded socket 77 having a threaded passageway 78 with an outwardly flared upper end 79 and connected to the top plate 27a of the body member 26. The outwardly flared portion 79 guides the supporting rod 13 to the threaded portion of the passageway 78. Thus, the setting tool may be quickly and easily connected to and disconnected from the plugging device 11. The socket 49 also allows rapid connection and removal of the drive shaft 14 from the plugging device 11.

In utilizing the plugging device 11, a hole must first be dug to the pipe 15, a coupon cut therefrom, and the half sections 17 and 18 welded to the pipes 15 and 16 as described hereinabove. The supporting rod 13 may then be threadedly secured in the socket 77 and the socket 49 on the drive shaft 14 may be caused to receive the shafts 14 and 47. Utilizing a setting tool (not shown) the supporting rod 13 and the drive shaft 14 are lowered to move the plugging device 11 into the position shown in FIG. 1. The end cap 19 may be lowered with the plugging device 11 and then bolted to the half sections 17 and 18 as shown in FIG. 1.

Figure 2:
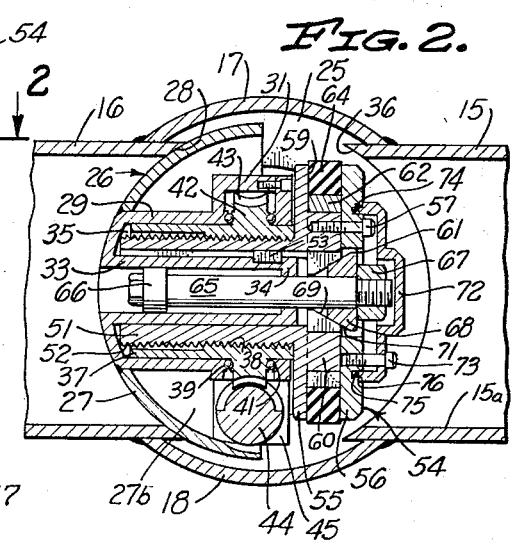
FIG. 2 is a fragmentary sectional view taken along line 2—2 of FIG. 1 and showing the plug before it has been advanced into the pipe.

With the plugging device 11 in the position shown in FIGS. 1 and 2, power may be supplied to the drive shaft 14 to cause such shaft to rotate. Such rotation is transmitted through the driving gear 44, and the gear 43 to the internally threaded sleeve 37. As the key 53 prevents rotation of the externally threaded sleeve 51, the latter is caused to translate relative to the body member 26. Assuming a proper direction of rotation of the drive shaft 14, the externally threaded sleeve 51 and the plug 54 will move toward the open end 36 of the pipe 15. Movement of the body member 26 away from the open end 36 is prevented by the engagement of the back wall 27 with the annular end 28 of the pipe section 16. Preferably the portions of the back wall 27 which engage the annular end 28 will conform to the shape of the annular end 28 as shown in FIGS. 2 and 3.

The plug 54 preferably moves axially into the pipe 15. The periphery of the sealing element 64 is spaced slightly from or engages only lightly the interior wall 15a of the pipe 15. The rod 65 moves with the plug 54 until the shoulder 66 formed thereon engages the abutment 34 on the hollow shaft 33. At that instant translation of the rod 65 and the cam member 68 is halted; however, the plug 54 and the cams 62 continue to move away from the body member 26. This causes the cams 62 to move relative to the cam member 68 and causes the cams 62 to move radially outwardly. Such outward movement of the cams 62 urges the sealing element 64 outwardly into fluid-tight sealing engagement with the interior wall 15a of the pipe 15 as shown in FIG. 3. To assure a fluid-tight seal, it is preferred to urge the sealing element 64 against the interior wall 15a with sufficient force to deform the resilient sealing element 64. When a fluid-tight seal is achieved, rotation of the drive shaft 14 may be stopped.

If the plugging device 11 is to remain in the pipe 15 for an extended period of time, it may be desirable to remove the setting tool therefrom to allow it to be used elsewhere. This is easily accomplished by merely unscrewing the supporting rod 13 from the socket 77 and pulling the shaft 14 from the socket 49. The setting tool may then be withdrawn from the hole leading to the pipe. If desired, the end cap 19 may be removed with the plugging device 11 and an unperforated end cap may be bolted to the half sections 17 and 18.

Figure 3:
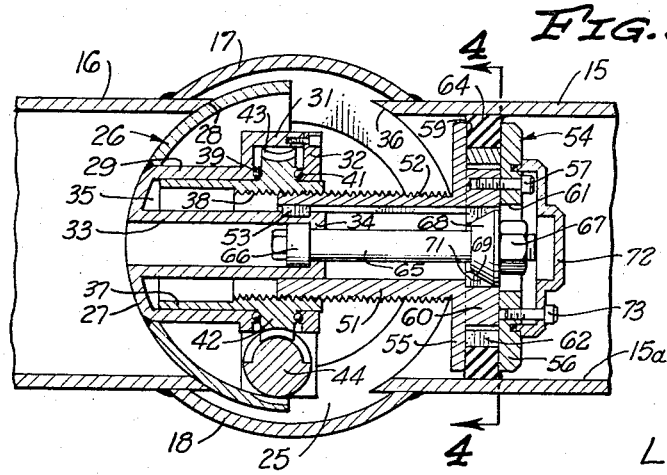
FIG. 3 is a fragmentary sectional view similar to FIG. 2 showing the plug advanced to a position within the pipe and engaging the interior wall of the pipe in fluid-tight sealing relationship.

In withdrawing the plug 54 from the pipe 15, the drive shaft 14 is rotated in the opposite direction, thereby causing the plug 54 to move from the position shown in FIG. 3 to that shown in FIG. 2.

The gears 43 and 44 and the threads on the sleeve 37 and 51 constitute gear means for moving the plug 54 into the pipe 15. The driving gear 44 is driven by an input force and the gear means move the plug 54 with a force considerably greater than such input force. Thus, when the plug 54 is in the position shown in FIG. 3, the setting tool may be removed therefrom as the plug 54 will remain in position within the pipe 15 even without providing separate locking means for the gear 44 or the rotatable shaft 47. The frictional engagement of the sealing element 64 with the interior wall 15a and the gear reduction effect achieved by the gear means make it practically impossible for any fluid under pressure within the pipe 15 to force the plug 54 toward the body member 26.

An important feature of this invention is the simplicity of operation of the plugging device. By rotating a single shaft, i.e. the rotatable shaft 47, the plug 54 can be moved into the pipe 15, the resilient sealing element 64 is urged radially outwardly into fluid-tight sealing engagement with the interior wall 15a, and the plug 54 may be withdrawn from the pipe 15. This operation is completely independent of the fluid within the pipe 15.

Many changes, modifications, and substitutions may be made by one having ordinary skill in the art without necessarily departing from the spirit and scope of this invention.

What is claimed is:

1. A plugging device for a fluid-carrying pipe having an interior wall defining a passage terminating in an open end, including:
    a body member adjacent the open end;
    a plug including a sealing element of a size to fit within the passage of the pipe;
    means for mounting said plug to said body member for movement toward and away from said body member;
    gear driving means for moving said plug a predetermined distance away from said body member and into the passage of the pipe; and
    means responsive to the movement of said plug said predetermined distance from said body member for urging said sealing element into tight sealing engagement with the interior wall of the passage.

2. A plugging device as defined in claim 1 wherein said sealing element is annular and constructed of resilient material and the last-mentioned means includes cam means for deforming said resilient sealing element radially outwardly into fluid-tight sealing engagement with the interior wall of the pipe.

3. A plugging device for a fluid-carrying pipe having an interior wall defining a passage terminating in an open end, including:
    a body member adjacent the open end;
    a plug including a resilient sealing element of a size to fit within the passage of the pipe;
    means for mounting said plug to said body member for movement toward and away from said body member;
    gear driving means for moving said plug away from said body member and through the open end of the pipe to a position within the passage thereof; and
    means responsive to further actuation of said gear driving means after said plug has reached said position for deforming said resilient sealing element radially outwardly into fluid-tight sealing engagement with the interior wall of the pipe.

4. A plugging device for a fluid-carrying pipe having an interior wall defining a passage terminating in an open end, including:
    a body member adjacent the open end;
    a plug including a sealing element of a size to fit within the passage of the pipe;
    means for mounting said plug to said body member for movement toward and away from said body member;
    a shaft rotatably mounted on said body member and rotatable by an input force;
    gear means responsive to rotation of said shaft for moving said plug with a force greater than said input force to a position within the passage of the pipe; and
    means responsive to rotation of said shaft when said plug is within the passage for urging said sealing element radially outwardly into fluid-tight frictional sealing engagement with the interior wall of the pipe.

5. A plugging device for a fluid-carrying pipe having an interior wall defining a passage terminating in an open end, including:
    a body member adjacent the open end;
    a plug including a housing carrying a resilient sealing element, said housing carrying cam means engageable with said sealing element for forcing said sealing element radially outwardly;
    means for mounting said plug to said body member for movement toward and away from said body member;
    means for moving said plug away from said body member and through the open end of the pipe to a predetermined position within the passage thereof;
    a cam member engageable with said cam means and mounted for movement with said plug and said cam means relative to said body member, said cam means being movable relative to said cam member to force said sealing element radially outwardly into fluid-tight sealing engagement with the interior wall of the pipe; and means on said housing to halt movement of said cam member relative to said body member while allowing said plug and said cam means to continue moving away from said body member to cause said cam means to move relative to said cam member, such relative movement between said cam means and said cam member forcing said cam means to urge said sealing element radially outwardly into fluid-tight sealing engagement with the interior wall of the pipe.

6. A plugging device for a fluid-carrying pipe having an interior wall defining a passage terminating in an open end, including:

a body member adjacent the open end;

a plug including a housing having an opening therethrough, said plug including a resilient sealing element carried by said housing and surrounding said opening;

means for mounting said plug to said body member for movement toward and away from said body member;

gear driving means for moving said plug away from said body member and through the open end of the pipe to a predetermined position within the passage thereof;

means at least partially within said opening in the housing responsive to said gear driving means when said plug is in said predetermined position for urging said resilient element radially outwardly into fluid-tight sealing engagement with the interior wall of the pipe;

a cover secured to said housing and closing the end of said opening remote from said body member; and sealing means for providing a fluid-tight seal between said cover and said housing.

7. A plugging device for a fluid-carrying pipe having an interior wall defining a passage terminating in an open end, including:

a body member having an annular recess facing the open end;

an internally threaded sleeve mounted in said recess for rotation relative to said body member, said internally threaded sleeve having gear means formed on the exterior thereof;

a plug including a housing and a resilient sealing element, said resilient sealing element being carried by said housing;

an externally threaded sleeve secured at one end to said housing and threadedly received by said internally threaded sleeve;

means for preventing translation of said internally threaded sleeve relative to said body member;

a driving gear rotatably secured to said body member and meshing with said gear means for rotating said internally threaded sleeve relative to said body member, rotation of said internally threaded sleeve moving said externally threaded sleeve and said plug through the open end of the pipe; and means for urging said resilient sealing element radially outwardly into fluid-tight sealing engagement with the interior wall of the pipe.

8. A plugging device for an underground fluid-carrying pipe having an interior wall defining a passage terminating in an open end, said plugging device being adapted to be lowered to a position adjacent the open end of the underground pipe by a setting tool and comprising:

a body member adjacent the open end;

means on said body member for releasably connecting the setting tool to said body member;

a rotatable shaft secured to said body member and extending upwardly, said shaft being connectible to the setting tool and rotatable thereby;

a plug including a resilient sealing element of a size to fit within the passage of the pipe;

means for mounting said plug to said body member for movement relative thereto;

means responsive to rotation of said shaft for moving said plug relative to said body member through the open end and into the passage of the pipe; and means responsive to rotation of the shaft for urging said resilient sealing element radially outwardly into fluid-tight sealing engagement with the interior wall of the pipe.

9. A plugging device for a piping system having first and second pipe sections with open spaced confronting ends including:

a body member having an outer surface, portions of said outer surface generally conforming to the contour of the open end of the first pipe section, said surface portions abutting the open end of the first pipe;

plugging means including a resilient sealing element of a size to fit within the passage of the second pipe section;

means for mounting said plugging means to said body member for movement relative thereto;

means for moving said plugging means relative to said body member through the open end of the second pipe section and into the second pipe section, said portions of said body member abutting the open end of the first pipe section substantially preventing movement of said body member away from the second pipe section; and means independent of the fluid in the second pipe section for deforming said resilient element radially outwardly into fluid-tight sealing engagement with the interior wall of the second pipe section.

10. A method of plugging a pipe utilizing a plugging device having a body member and a resilient sealing element, including the steps of:

cutting a hole completely through said pipe to provide first and second spaced pipe sections with opposed open ends;

securing a hollow housing having an opening through a wall thereof to said first and second pipe sections adjacent the opposed open ends, the opening in said housing being in communication with said open ends;

inserting said plugging device through said opening in said housing and into the space between said pipe sections until said resilient sealing element is substantially axially aligned with said first pipe section;

drivingly moving said sealing element into the interior of said first pipe section a predetermined distance away from said body member; and deforming said resilient sealing element radially outwardly into fluid-tight fluid engagement with the passage of said first pipe section.

11. A method of plugging a pipe utilizing a plugging device having a body member and a resilient sealing element, including the steps of:

cutting a hole completely through said pipe to provide first and second spaced pipe sections with opposed open ends;

securing a hollow housing having an opening through a wall thereof to said first and second pipe sections adjacent the opposed open ends, the opening in said housing being in communication with said open ends;

inserting said plugging device through said opening in said housing and into the space between said pipe sections until said resilient sealing element is substantially axially aligned with said first pipe section;

drivingly moving said sealing element into the interior of said first pipe section a predetermined distance away from said body member; and camming said resilient sealing element radially outwardly into fluid-tight fluid engagement with the passage of said first pipe section.

12. A method for plugging an underground pipe with a plugging device having a resilient sealing element, including the steps of:

forming an excavation reading to said pipe;
cutting a coupon from said pipe to provide first and second spaced pipe sections with opposed open ends;
providing a setting tool;
releasably securing said setting tool to said plugging device;
causing said setting tool to lower said plugging device through said excavation and into the space between said pipe sections until said sealing element is substantially axially aligned with said first pipe section;
causing said setting tool to drivingly move said sealing element into the passage of said first pipe section to tightly seal said passage;
removing said setting tool from said plugging device; and
withdrawing said setting tool leaving said sealing element with said first pipe section.

References Cited

UNITED STATES PATENTS

| | | | |
|---|---|---|---|
| RE. 23,526 | 7/1952 | Preston et al. | 138—94 |
| 1,146,944 | 7/1915 | Middleton | 220—24.5 |
| 1,177,338 | 3/1916 | Kayfetz | 138—94 |
| 1,181,984 | 5/1916 | Arni | 220—24.5 X |
| 2,929,410 | 3/1960 | Morrison | 138—97 |
| 3,025,885 | 3/1962 | Ver Nooy | 138—94 |
| 3,144,880 | 8/1964 | Witska | 138—97 |
| 3,155,369 | 11/1964 | Wright et al. | 138—94 X |

FOREIGN PATENTS 1,147,893  6/1957  France.

LAVERNE D. GEIGER, *Primary Examiner.*

B. KILE, *Assistant Examiner.*